(12) United States Patent
Christopher et al.

(10) Patent No.: US 9,403,234 B2
(45) Date of Patent: Aug. 2, 2016

(54) WIRE FEEDING SYSTEMS AND DEVICES

(71) Applicant: Illinois Tool Works Inc., Glenview, IL (US)

(72) Inventors: Mark R. Christopher, Neenah, WI (US); Brian Lee Ott, Sherwood, WI (US); Michael P. Vandenberg, Kaukauna, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 214 days.

(21) Appl. No.: 13/655,134

(22) Filed: Oct. 18, 2012

(65) Prior Publication Data

US 2013/0112677 A1    May 9, 2013

Related U.S. Application Data

(60) Provisional application No. 61/556,641, filed on Nov. 7, 2011.

(51) Int. Cl.
| | | |
|---|---|---|
| *B23K 9/12* | (2006.01) | |
| *B23K 9/133* | (2006.01) | |
| *B65H 63/08* | (2006.01) | |
| *B65H 59/38* | (2006.01) | |

(52) U.S. Cl.
CPC ............ *B23K 9/1333* (2013.01); *B65H 59/387* (2013.01); *B65H 63/082* (2013.01); *B65H 2701/36* (2013.01)

(58) Field of Classification Search
CPC .... B23K 3/063; B23K 9/1333; B23K 9/1336; B65H 51/20; B65H 63/08; B65H 63/082; B65H 63/084; B65H 63/086

USPC ........... 219/137.71; 228/11; 242/364.7, 364.8
See application file for complete search history.

(56) References Cited

U.S. PATENT DOCUMENTS

| | | | |
|---|---|---|---|
| 5,526,975 A | | 6/1996 | Endo |
| 5,794,869 A | * | 8/1998 | Takano et al. .............. 242/331.5 |
| 6,213,374 B1 | | 4/2001 | Ueda et al. |
| 6,247,664 B1 | * | 6/2001 | Petersen et al. ............ 242/485.6 |
| 2006/0070987 A1 | * | 4/2006 | Daniel ..................... 219/137.71 |
| 2006/0138116 A1 | * | 6/2006 | Lipnevicius ............. 219/137.71 |

FOREIGN PATENT DOCUMENTS

| | | |
|---|---|---|
| CN | 1234306 | 11/1999 |
| CN | 1802234 | 7/2006 |

(Continued)

OTHER PUBLICATIONS

FR 2944271 Machine Translation—Performed on Jan. 7, 2016 through ESPACENET.*
PCT International Search Report & Written Opinion of PCT/US2012/063545 dated Mar. 7, 2013, 10 pages.

*Primary Examiner* — Brian Jennison
(74) *Attorney, Agent, or Firm* — Fletcher Yoder P.C.

(57) ABSTRACT

Provided herein are systems including a wire spool having a core with a core diameter and wire wound around the core and having a wire diameter. An outer diameter of the wire spool is defined by a sum of the core diameter and the wire diameter. The systems may also include a sensing system having a sensor component disposed on the wire spool and/or a wire spool hub. The sensing system is adapted to acquire data corresponding to a parameter indicative of the outer diameter of the wire spool.

15 Claims, 10 Drawing Sheets

(56) References Cited

FOREIGN PATENT DOCUMENTS

| | | | |
|---|---|---|---|
| DE | 4320405 | 12/1994 | |
| DE | 202006004122 U1 | 5/2006 | |
| EP | 0803310 A1 | 10/1997 | |
| FR | 2944271 A1 * | 10/2010 | ......... B65H 54/2884 |

* cited by examiner

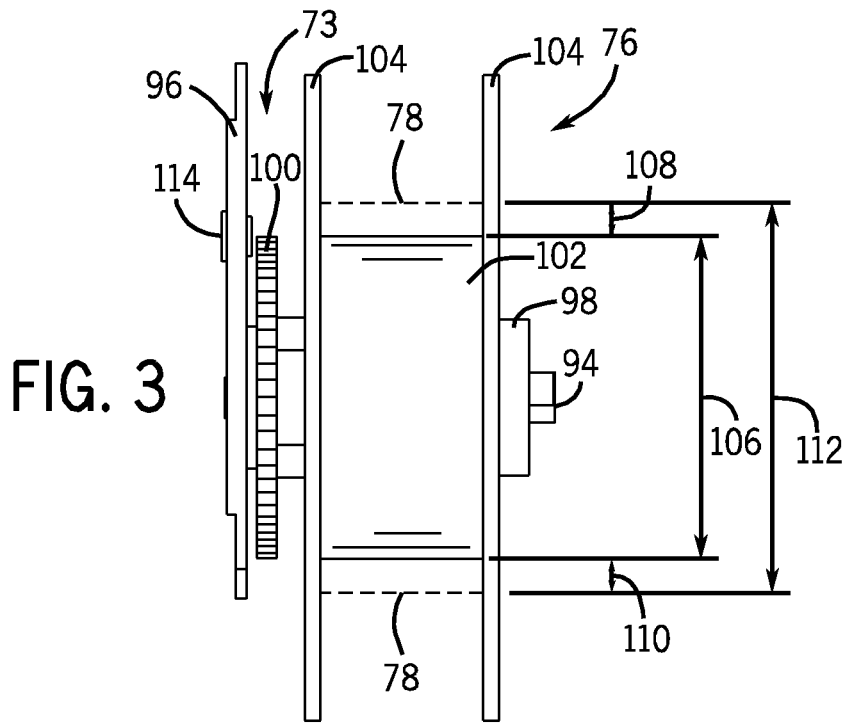
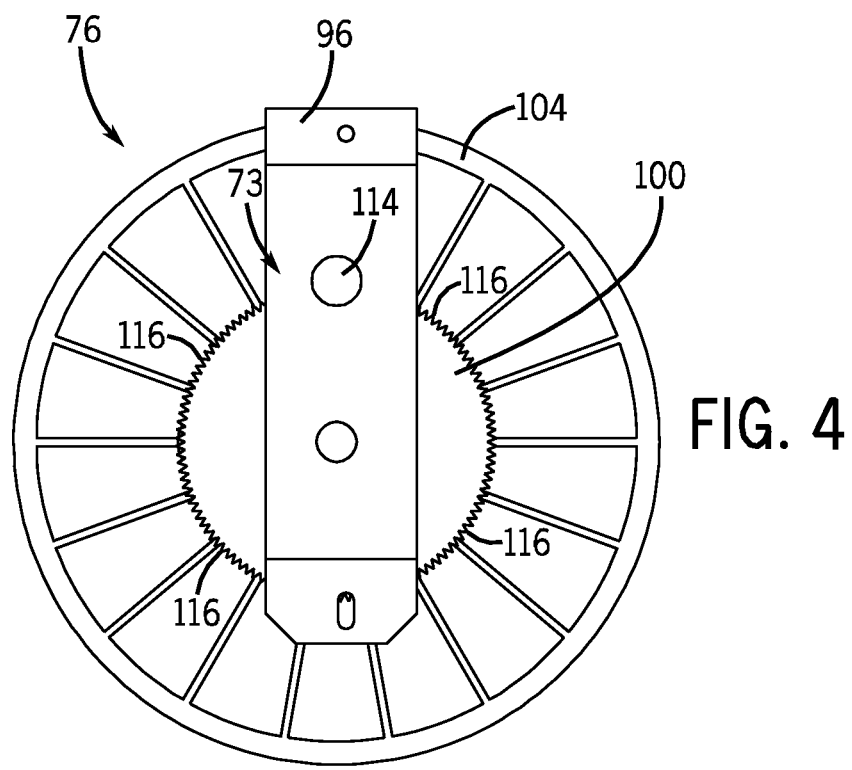

WIRE FEEDING SYSTEMS AND DEVICES

CROSS REFERENCE TO RELATED APPLICATIONS

This application is a Non-provisional patent application of U.S. Provisional Patent Application No. 61/556,641, entitled "Wire Feeding Systems and Devices", filed Nov. 7, 2011, which is herein incorporated by reference.

BACKGROUND

The invention relates generally to welding wire feed systems, and, more particularly, to sensing systems for monitoring a wire spool size during a welding operation.

Welding is a process that has become ubiquitous in various industries for a variety of types of applications. For example, welding is often performed in applications such as shipbuilding, aircraft repair, construction, and so forth. Such welding operations rely on a variety of types of equipment to ensure the supply of welding consumables (e.g., wire feed, shielding gas, etc.) is provided to the weld in an appropriate amount at the desired time. For example, metal inert gas (MIG) welding typically relies on a wire feeder to ensure a proper wire feed reaches a welding torch. Typically, parameters of the wire feeding operation are set prior to initiation of a welding operation. However, throughout the welding operation, wire is typically fed from a wire spool in the wire feeder to a welding device, and the fed wire is consumed in the welding operation. Unfortunately, as the wire is unwound from the wire spool and the wire supply diminishes, the operator may be unaware of the quantity of wire remaining on the spool. As such, in certain instances, the operator may continue to weld until the wire supply is exhausted, thus interrupting the welding operation. These instances decrease overall productivity and may lead to burn back occurrences. Accordingly, there exists a need for wire feeder systems that overcome these drawbacks.

BRIEF DESCRIPTION

In one embodiment, a system includes a wire spool having a core with a core diameter and wire wound around the core and having a wire diameter. An outer diameter of the wire spool is defined by a sum of the core diameter and the wire diameter. The system also includes a sensing system having a sensor component disposed on the wire spool and/or a wire spool hub. The sensing system is adapted to acquire data corresponding to a parameter indicative of the outer diameter of the wire spool.

In another embodiment, a welding wire feed system includes a wire feeder. The wire feeder includes a spool mounting hub and a wire spool mounted on the spool mounting hub. The wire spool includes a core and wire wound around the core. The wire feeder also includes a speed/position sensor (e.g., a tachometer) coupled to the spool mounting hub, the wire spool, or both, and adapted to measure a rotational speed of the wire spool as the wire is unwound from the core. The welding wire feed system further includes control circuitry adapted to receive data corresponding to the rotational speed of the wire spool and to determine an outer diameter of the wire spool based on the received data. The outer diameter is defined by a diameter of the core combined with a diameter of the wound wire.

In another embodiment, a welding wire feed system includes a spool mounting hub and a wire spool mounted on the spool mounting hub. The wire spool has a core and wire wound around the core, and an outer diameter of the wire spool is defined by a diameter of the core combined with a diameter of the wound wire. The wire feed system also includes a wire feed drive mechanism adapted to unwind the wire from the core to supply the wire to a welding operation. The wire feed system also includes a speed/position sensor (e.g., a tachometer) coupled to the spool mounting hub, the wire spool, or both, and adapted to measure a rotational speed of the wire spool as the wire is unwound from the core.

DRAWINGS

These and other features, aspects, and advantages of the present invention will become better understood when the following detailed description is read with reference to the accompanying drawings in which like characters represent like parts throughout the drawings, wherein:

FIG. 3 illustrates a wire spool and a sensing system mounted on a spindle and a spindle mount;

FIG. 4 is a side view of the wire spool and sensing system of FIG. 3;

DETAILED DESCRIPTION

As described in detail below, provided herein are embodiments of welding wire feed systems capable of directly or indirectly monitoring an outer diameter of a wire spool. For example, in certain embodiments, a sensing system may include a speed/position sensor (e.g., a tachometer) coupled to a wire spool and/or a wire spool hub on which the wire spool is mounted. In these embodiments, the tachometer measures the rotational speed of the wire spool as wire is unwound from a core of the wire spool. Control and processing circuitry may utilize the measured rotational speed of the wire spool to determine an outer diameter of the wire spool at any given point during a welding operation. Further, the control circuitry may utilize the outer diameter to control and/or monitor the welding process, for example, by tracking the outer diameter of the wire spool over time, utilizing the determined outer diameter to control an operational parameter of the welding process, utilizing the outer diameter to determine an error condition, and so forth. The foregoing features may offer distinct advantages over systems that are not capable of monitoring the outer diameter of the wire spool during the welding operation. For example, presently disclosed embodiments may be capable of alerting a welding operator when the wire remaining on the wire spool is approaching a predetermined limit, for instance, when the outer diameter of the wire spool is approaching the core diameter. These embodiments may reduce or eliminate the likelihood of a burn back occurring due to an operator not being aware of a lack of wire on the wire spool. For further example, in some embodiments, by monitoring the outer diameter of the wire spool, the control system may be capable of determining when the drive rolls are slipping and alerting the operator to the error. These and other advantages of the presently disclosed embodiments of welding wire feed systems are described in more detail below.

Figure 1:
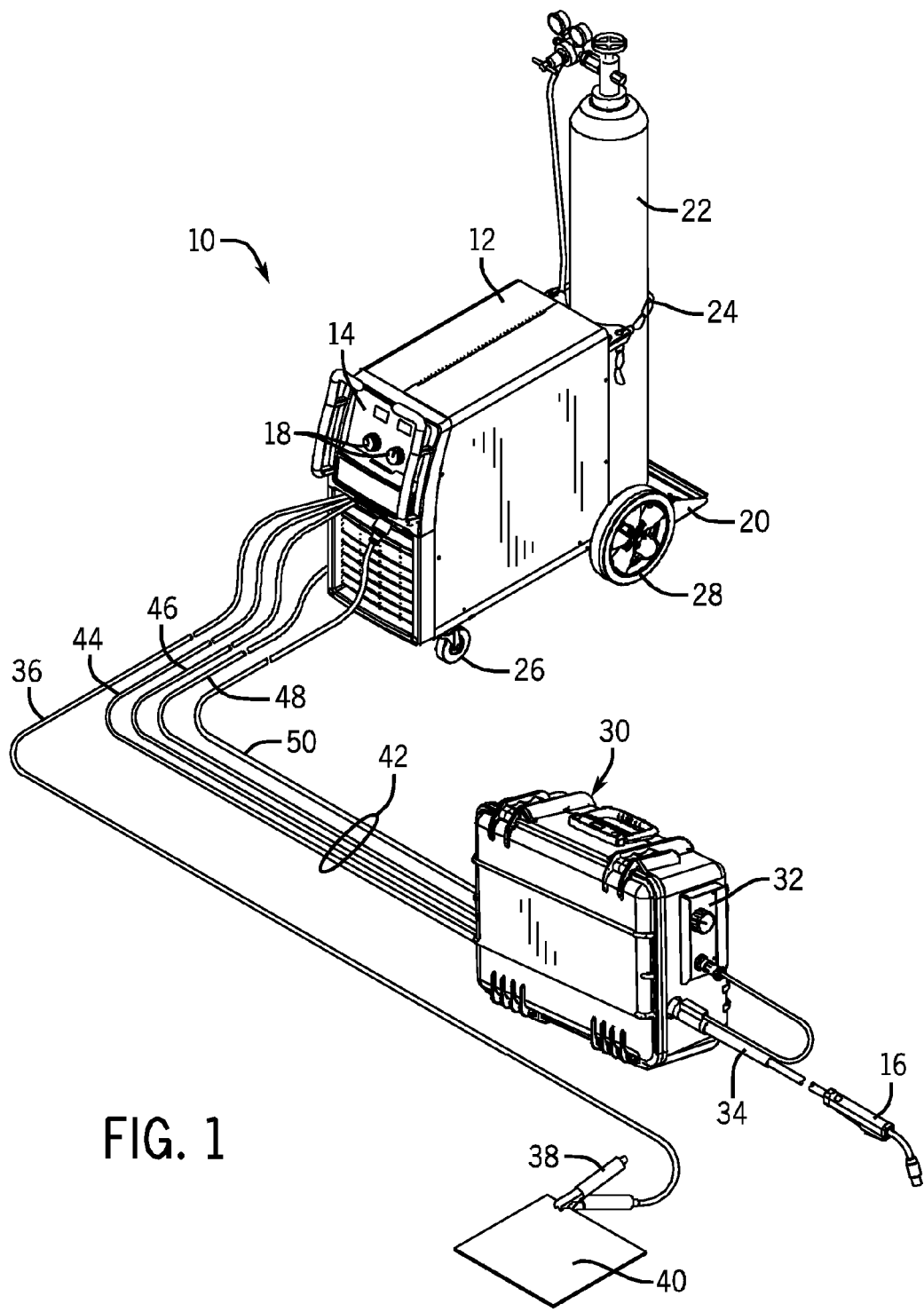
FIG. 1 illustrates an embodiment of a welding system that powers, controls, and provides supplies to a welding operation.

Turning now to the drawings, FIG. 1 illustrates an exemplary welding system 10 which powers, controls, and provides supplies to a welding operation. The welding system 10 includes a welder 12 having a control panel 14, through which a welding operator may control the supply of welding materials, such as gas flow, wire feed, and so forth, to a welding torch 16. The control panel 14 includes input or interface devices, such as knobs 18, which the operator may use to adjust welding parameters (e.g., voltage, current, etc.). That is, the operator interface 14 on the welder 12 enables data settings to be selected by the operator. The operator interface 14 may allow for selection of settings such as the weld process, the type of wire to be used, voltage and current settings, and so forth. In particular, the system is designed to allow for MIG welding with aluminum or other welding wire that is both pushed towards the torch 16 and pulled through the torch 16. However, in other embodiments, the welding system may be designed to allow for other types of wire feeds, such as pull only or push only systems.

In the illustrated embodiment, the welder 12 includes a tray 20 mounted on a back of the welder 12 and configured to support a gas cylinder 22 held in place with a chain 24. However, in other embodiments, the gas cylinder 22 may not be mounted on the welder 12 or may not be utilized in the welding system 10, for example, for gasless welding operations. In embodiments in which gas is desired for the welding operation, the gas cylinder 22 is the source of the gas that supplies the welding torch 16. Furthermore, the welder 12 may be portable via a set of smaller front wheels 26 and a set of larger back wheels 28, which enable the operator to move the welder 12 to the location of the weld or the welder 12 may be stationary as desired by the operator. Indeed, the illustrated welding system 10 is merely an example and may be modified as suitable for the type of welding or cutting operation being performed.

The illustrated welding system 10 also includes a suitcase wire feeder 30 that provides welding wire to the welding torch 16 for use in the welding operation. However, it should be noted that although the wire feeder 30 shown in the embodiment of FIG. 1 is a suitcase style feeder, in other embodiments, the wire feeder 30 may be any suitable wire feeding system, such as any of a variety of push-pull wire feeder systems, configured to utilize one or more motors to establish a wire feed to a welding torch. Indeed, embodiments of the present invention may be utilized in conjunction with bench style feeders and/or non-bench style feeders, such as boom mounted style feeders and portable, suitcase-style wire feeders.

In the illustrated embodiment, the wire feeder 30 includes a control panel 32 that allows the user to set one or more desired parameters. For example, in some embodiments, parameters of the wire feed (e.g., rate of wire feed, wire diameter, etc.) may be controlled via control panel 32. For further example, in some embodiments, the control panel 32 on the wire feeder may include controls that duplicate one or more controls on the control panel 14 and enable the operator to alter one or more parameters of the welding operation. In such embodiments, the wire feeder 30 may communicate with the welding power source 12 to coordinate the welding and wire feeding operations.

Additionally, the wire feeder 30 may house a variety of internal components, such as a wire spool, a wire feed drive system, a motor, a sensing system, and so forth. For example, some embodiments may include a sensing system having a sensor component disposed on the wire spool or a wire spool hub for measuring the rotational speed of the wire spool as wire is fed to the welding torch 16 for use in the welding operation. The sensing system may include any one of various speed and/or position sensing components such as tachometers, Hall effect sensors, optical or electronic sensors, gear teeth, magnetic strips, physical slits, and so forth, capable of cooperating to enable measurement of the rotational speed of the wire spool, which can be utilized to calculate the outer diameter, or to enable direct measurement of the outer diameter or a change in the outer diameter throughout the welding operation. In embodiments in which the outer diameter is not directly measured, the rotational speed may be utilized by a controller located in the wire feeder 30 or the welder 12 to monitor the outer diameter of the wire spool (e.g., the sum of the diameter of the wire spool core and the diameter of the wound wire) throughout the welding operation, as described in more detail below.

In some embodiments, the welding power received from the welder 12 may be utilized by the internal components of the wire feeder 30 to power the gas flow and wire feed operations if desired for the given welding operation. As such, the wire feeder 30 may be used with any wire feeding process, such as gas operations (gas metal arc welding (GMAW)) or gasless operations (shielded metal arc welding (SMAW)). For example, the wire feeder 30 may be used in metal inert gas (MIG) welding or stick welding.

As shown, various cables couple the components of the welding system 10 together and facilitate the supply of welding materials to the welding torch 16. A first lead assembly 34 couples the welding torch 16 to the wire feeder 30. The first lead assembly 34 provides power, control signals, and welding consumables to the welding torch 16. For example, the first lead assembly 34 may supply the welding torch 16 with welding wire at a wire feed speed established by the wire feed motor system and dictated by, for example, a weld controller located in the welder 12. This welding wire is typically unwound from a wire spool mounted on a wire spool hub located in the wire feeder 30 as the wire spool rotates at a given rotational speed within the wire feeder 30.

A second cable 36 couples the welder 12 to a work clamp 38 that connects to a workpiece 40 to complete the circuit between the welder 12 and the welding torch 16 during a welding operation. A bundle 42 of cables couples the welder 12 to the wire feeder 30 and provides weld materials for use in the welding operation. The bundle 42 includes a feeder power lead 44, a weld cable 46, a gas hose 48, and a weld control cable 50. Depending on the polarity of the welding process, the feeder power lead 44 may connect to the same weld terminal as the cable 36. It should be noted that the bundle 42 of cables may not be bundled together in some embodiments.

It should be noted that modifications to the exemplary welding system 10 of FIG. 1 may be made in accordance with aspects of the present invention. For example, the tray 20 may be eliminated from the welder 12, and the gas cylinder 22 may be located on an auxiliary support cart or in a location remote from the welding operation. Furthermore, as previously mentioned, although the illustrated embodiments are described in the context of a MIG welding process, one or more features of the invention may be utilized with a variety of other suitable welding or wire feeding systems and processes.

Figure 2:
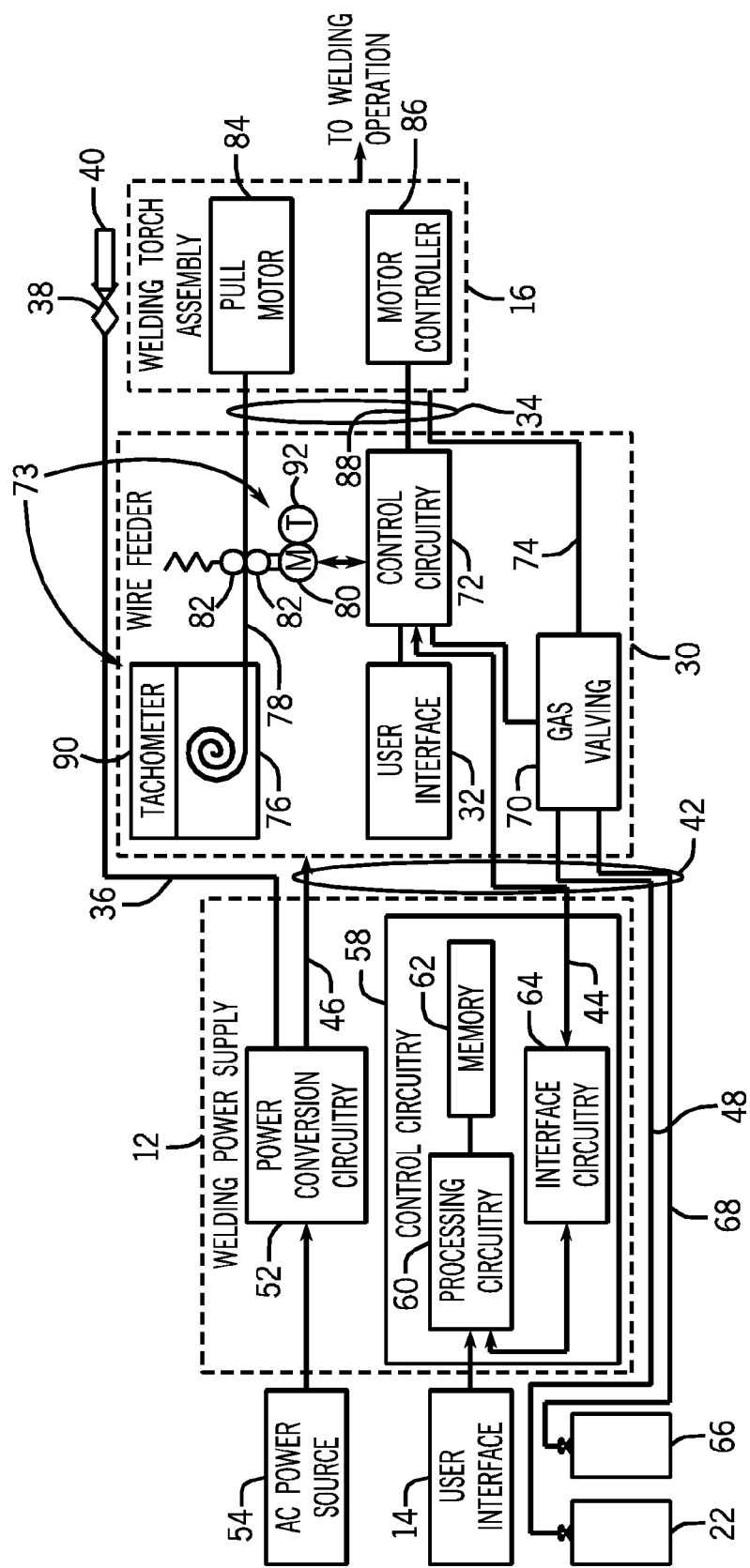
FIG. 2 is a block diagram illustrating embodiments of internal components of the welder, the wire feeder, and the welding torch assembly of FIG. 1.

FIG. 2 is a block diagram illustrating internal components of the welder 12, the wire feeder 30, and the welding torch assembly 16. In the illustrated embodiment, the welder 12 includes power conversion circuitry 52 that receives input power from an alternating current power source 54 (e.g., the AC power grid, an engine/generator set, a battery, or a combination thereof), conditions the input power, and provides output power via lead 46 to the cable 34 to power one or more welding devices (e.g., welding torch assembly 16) in accordance with demands of the system 10. Accordingly, in some embodiments, the power conversion circuitry 52 may include circuit elements, such as transformers, rectifiers, switches, and so forth, capable of converting the AC input power to a direct current electrode positive (DCEP) or direct current electrode negative (DCEN) output, as dictated by the demands of the system 10. The lead cable 36 terminating in the clamp 38 couples the power conversion circuitry 52 to the workpiece 40 and closes the circuit between the power source 12, the workpiece 40, and the welding torch 16.

The welding power supply 12 also includes control circuitry 58 that is configured to receive and process a plurality of inputs regarding the performance and demands of the system 10. The control circuitry 58 includes processing circuitry 60 and memory 62. The memory 62 may include volatile or non-volatile memory, such as ROM, RAM, magnetic storage memory, optical storage memory, or a combination thereof. Furthermore, a variety of control parameters may be stored in the memory 62 along with code configured to provide a specific output (e.g., initiate wire feed, enable gas flow, etc.) during operation. The processing circuitry 60 may also receive one or more inputs from the user interface 14, through which the user may choose a process and input desired parameters (e.g., voltages, currents, particular pulsed or non-pulsed welding regimes, and so forth).

Based on such inputs received from the operator, the control circuitry 58 operates to control generation of welding power output that is applied to the welding wire for carrying out the desired welding operation, for example, via control signals transmitted to the power conversion circuitry 52. Based on such control commands, the power conversion circuitry 52 is adapted to create the output power that will ultimately be applied to the welding wire at the torch 16. To this end, various power conversion circuits may be employed, including choppers, boost circuitry, buck circuitry, inverters, converters, and so forth. Still further, in the embodiment of FIG. 2, the control circuitry 58 also includes interface circuitry 64 configured to interface with the electronics of the wire feeder 30 during operation. The interface circuitry 64 is coupled to the processing circuitry 60 as well as to components of the wire feeder 30. Further, the processing circuitry 60 provides control signals associated with the weld operation to the wire feeder 30 via cable 44 coupled to the interface circuitry 64.

As before, the welder 12 and the wire feeder 30 are coupled to one another via the bundle 42 of cables, and the welding torch assembly 16 is coupled to the wire feeder 30 via cable bundle 34. In the illustrated embodiment, gas tanks 22 and 66 are configured to supply shielding gases, such as argon, helium, carbon dioxide, and so forth, via hoses 48 and 68, respectively, for use in the welding operation. In the embodiment illustrated in FIG. 2, the gas enters gas valving 70 located in the wire feeder 30. The gas valving 70 communicates with controller 72 of the wire feeder 30 to determine the quantity and flow rate of the gas to output via gas conduit 74.

The wire feeder 30 also includes the user interface 32 that allows for information such as wire feed speeds, processes, selected currents, voltages or power levels, and so forth to be set on either the power supply 12, the wire feeder 30, or both. As such, the user interface 32 is coupled to the controller 72, which allows for wire feed speeds to be controlled in accordance with operator selections, and permits these settings to be fed back to the power supply 12 via the interface circuitry 64. Further, the control circuitry 72 in the wire feeder 30 may communicate with the interface circuitry 64 to convey information obtained via a sensing system 73 located in the wire feeder 30. The sensing system 73 is capable of acquiring data corresponding to a parameter (e.g., a rotational speed of a wire spool, a wire feed speed, etc.) that is indicative of the outer diameter of a wire spool 76, as discussed in more detail below.

The wire feeder 30 also includes components for feeding wire to the welding torch 16 and thereby to the welding operation, under the control of controller 72. For example, one or more spools 76 of welding wire 78 are housed in the wire feeder 30. Welding wire 78 is unspooled from the spools 76 and is progressively fed to the torch 16. A feed motor 80 is provided that engages with feed rollers 82 to push wire from the wire feeder 30 towards the torch 16. In practice, one of the rollers 82 is mechanically coupled to the motor 80 and is rotated by the motor 80 to drive the wire 78 from the wire feeder 30, while the mating roller is biased towards the wire 78 to maintain good contact between the two rollers and the wire. Some systems may include multiple rollers of this type.

Power from the welding power supply 12 is applied to the wire 78, typically by means of the welding cable 46, in a conventional manner. During welding operations, the wire is advanced through the welding cable 34 towards the torch 16. Within the torch, an additional pull motor 84 may be provided with an associated drive roller and motor controller 86. During operation, the pull motor 84 operates one or more drive rolls to establish and maintain a desired wire feed rate, for example, as selected by an operator on interface 32 located on the wire feeder 30. Operation of the pull motor 84 may be controlled in any of a variety of suitable ways. For example, the motor controller 86, alone or in conjunction with control circuitry 58 and/or control circuitry 72, may control operation of the pull motor 84. The control circuitry may control the motors 80 and 84 in accordance with one or more received inputs. For example, a trigger switch may be located on the torch 16 to provide a signal that is fed back to the wire feeder via data cable 88 and then the power supply via cable 44 to enable the welding process to be started and stopped by the operator. That is, upon depression of the trigger switch, gas flow is begun, wire is advanced, power is applied to the welding cable 46 and through the torch to the advancing welding wire.

In the illustrated embodiment, wire feeder 30 also includes the sensing system 73. During operation, the sensing system 73 measures one or more parameters of the wire feeding operation that are indicative of the outer diameter of the wire spool 76. To that end, in the illustrated embodiment, the sensing system 73 includes one or more tachometers 90 and 92 that measure the desired parameters throughout the weld operation. As the sensing system 73 acquires such data regarding the feeding of wire to the welding torch 16, the data is communicated to the control circuitry 72 in the wire feeder 30.

In particular, the sensing system 73 shown in FIG. 2 includes tachometer 92 that is coupled to motor 80 to sense the wire feed speed. However, the sensing system 73 also includes the tachometer 90 that is coupled to the wire spool 76. During the wire feeding operation, the tachometer 90 measures the rotational speed of the wire spool 76. In one embodiment, the control circuitry 72 may utilize the measurements from the tachometer 90 and the tachometer 92 to compute the outer diameter of the wire 76 remaining on the spool by dividing the wire feed speed by a quantity defined by the rotational speed of the wire spool 76 multiplied by pi. This outer diameter may then be utilized to control the wire feed speed process, to determine when the wire supply on the wire spool 76 has been exhausted or is close to being exhausted, and so forth. It should be noted that although the sensing system 73 in FIG. 2 includes tachometers 90 and 92, a variety of other sensing system configurations are presently contemplated and discussed in more detail below. Indeed, the sensing system 73 is subject to considerable implementation-specific configurations and is not meant to be limited to those illustrated herein.

It should be noted that the sensing system 73 may be provided as an integral part of the wire feeder 30 in some embodiments. That is, the sensing system 73 may be integrated into the wire feeder 30, for example, during manufacturing. However, in other embodiments, the sensing system 73 may be provided as a retrofit kit that may enable existing wire spools 76 and/or wire feeding systems with the wire spool outer diameter monitoring described herein. To that end, such retrofit kits may be configured as wired or wireless devices capable of communicating with one or more controllers of the weld system. For example, in one embodiment of the retrofit kit, the sensing system may be configured to mount to the wire spool and be programmable to communicate with the desired controller (e.g., controller 72 located in the wire feeder).

In the illustrated embodiment, the sensing system 73 provides feedback to the controller 72 and/or the processing circuitry 60 via a wired connection. However, it should be noted that in other embodiments, communication between components of the wire feeder 30 (e.g., the sensing system, the wire drive components, etc.) and/or components of the welder 12 may occur via a wireless communication link. Indeed, any suitable method of conveying data corresponding to a parameter indicative of the outer diameter of the wire spool to one or more controllers capable of altering weld parameters and/or alerting an operator to the presence of an error may be employed in presently contemplated embodiments, not limited to wired connections.

FIGS. 3 and 4 illustrate an embodiment of an example of a sensing system 73 that is suitable for obtaining data corresponding to a parameter that is indicative of an outer diameter of the wire spool 76. Specifically, FIG. 3 is a top view illustrating an embodiment of the sensing system 73 and the wire spool 76 mounted on a substantially stationary spindle 94. As shown, the spindle 94 extends from a substantially stationary spindle mount 96 that provides a support structure for the wire spool 76 during the wire feeding operation. As understood by those skilled in the art, the spindle mount 96 is typically located within the wire feeder 30. In the illustrated embodiment, the spindle 94 receives a wire spool hub 98 that is adapted to rotate along with the wire spool 76 during the wire feeding process. Additionally, a gear component 100 is mounted on the wire spool hub 98 between the wire spool 76 and the spindle mount 96.

Still further, in the illustrated embodiment, the wire spool 76 is mounted on the spool mounting hub 98. The wire spool 76 includes a core 102 disposed between a set of plates 104 and having a core diameter 106. The wire 78 is wound around the core 102 and a wire diameter is defined by the distances 108 and 110. An outer diameter 112 of the wire spool 76 is therefore defined by the sum of the core diameter 106 and the wire diameter 108 and 110. It should be noted that although in the presently disclosed embodiments, the outer diameter 112 is utilized to determine a control parameter for the wire feeding operation and as a basis for determining when an error is communicated to the operator, any parameter that is indicative of the amount of wire wound on the core may be utilized instead of the outer diameter. For example, in some embodiments, the radius of the core and the wire wound thereon may be utilized in place of the outer diameter. Indeed the outer diameter is just one of a variety of suitable parameters that may be monitored in accordance with presently disclosed embodiments.

In the embodiment shown in FIGS. 3 and 4, the sensing system 73 includes the gear component 100 and a sensor 114 integrated with the spindle mount 96. During a wire feeding operation, the wire spool 76 rotates to feed the wire 78 to the welding torch, and the sensing system 73 measures the rotational speed of the wire spool 76. More particularly, in this embodiment, the sensor 114, which is mounted on the substantially stationary spindle mount 96, detects the motion of gear teeth 116 as the gear component 100 rotates with the wire spool 76 and the wire spool hub 98. Since the gear component 100 rotates at approximately the same speed as the wire spool 76, the detected rotational speed of the gear component 100 may be equated to the rotational speed of the wire spool 76.

Figure 5:
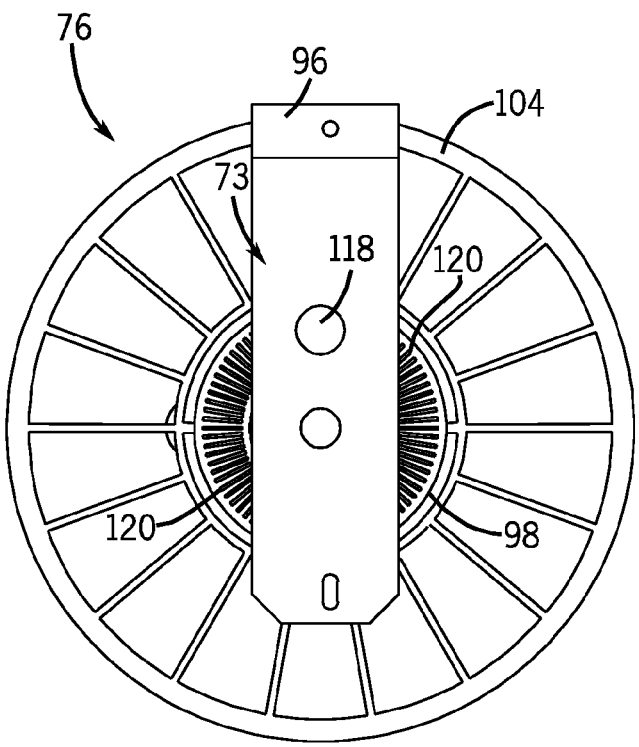
FIG. 5 illustrates a sensing system including a sensor and a plurality of slits disposed on a spool mounting hub.
Figure 6:
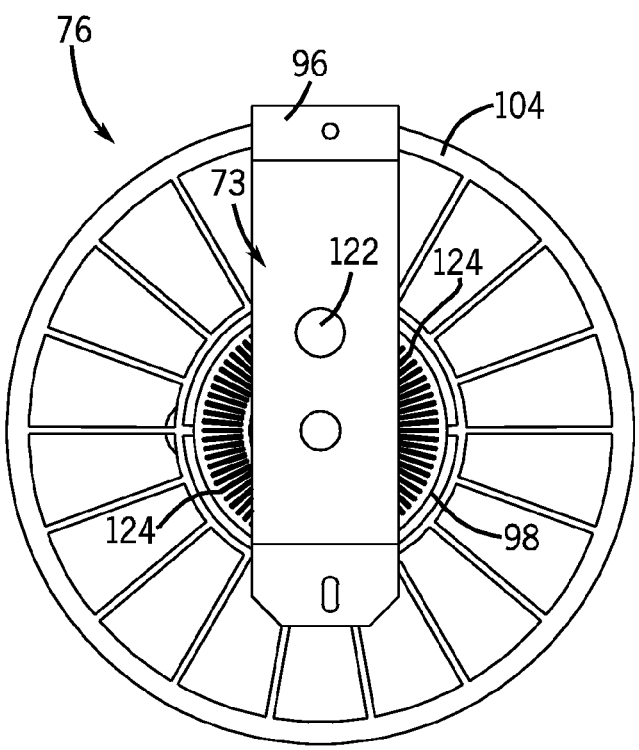
FIG. 6 illustrates a sensing system including a sensor and a plurality of magnetic strips disposed on a spool mounting hub.

FIGS. 5 and 6 illustrate side views of alternate embodiments of the sensing system 73 that may be utilized to acquire data indicative of the rotational speed of the wire spool 76. In particular, in the embodiment shown in FIG. 5, the sensing system includes a sensor 118 integrated with the stationary spindle mount 96 and a plurality of slits 120 disposed on the hub 98. As the wire spool hub 98 rotates with the wire spool 76, the rotational movement of the slits 120 is detected by the sensor 118, which may be an encoder-type sensor. Similarly, in the embodiment of FIG. 6, the sensing system 73 includes a sensor 122 integrated with the substantially stationary spindle mount 96 and a plurality of magnetic strips 124 disposed on the hub 98. As before, the wire spool hub 98 rotates with the wire spool 76, and the rotational movement of the magnetic strips 124 is detected by the sensor 122, which may be a Hall effect sensor in some embodiments.

Figure 7:
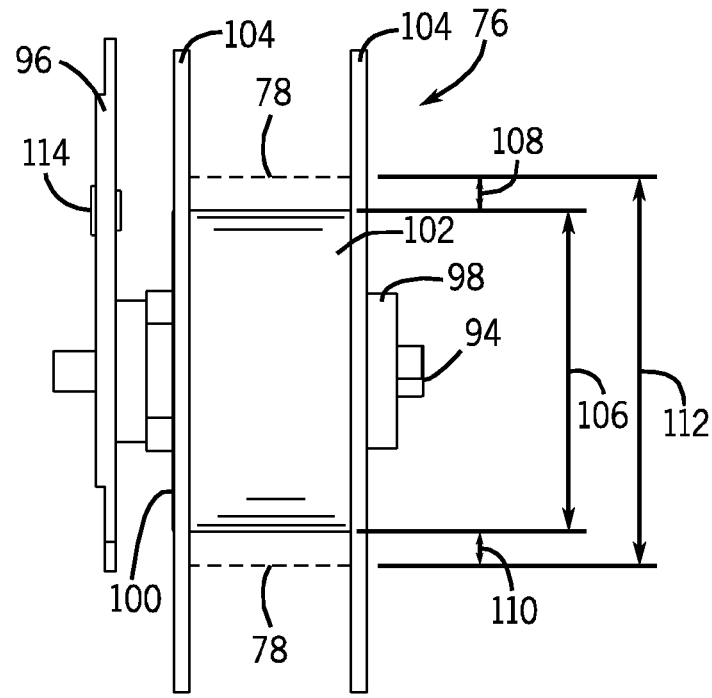
FIG. 7 illustrates a wire spool and a sensing system mounted on a spindle and a spindle mount.
Figure 8:
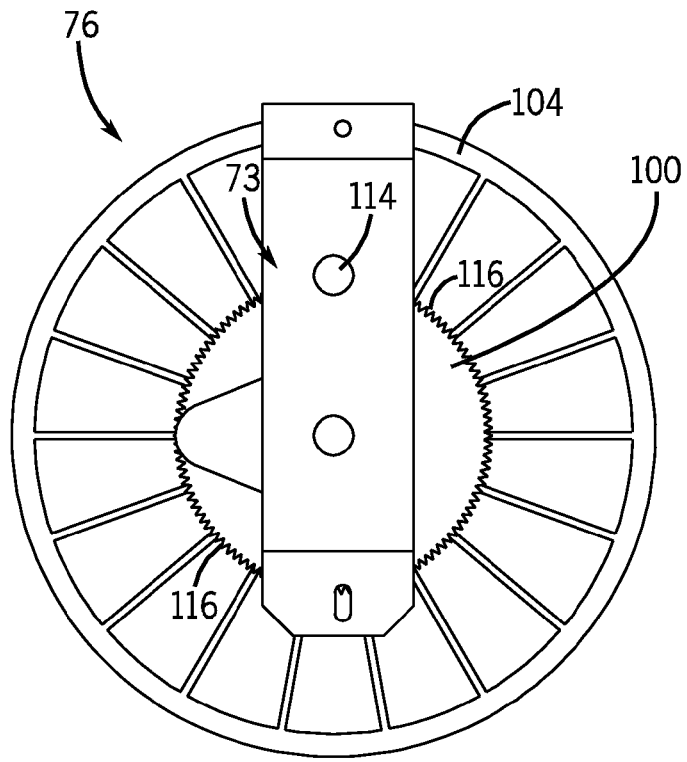
FIG. 8 illustrates a sensing system including a sensor and a gear component disposed on a wire spool.

FIGS. 7 and 8 illustrate an alternate configuration of the sensing system 73 shown in FIGS. 3 and 4. As before, the sensing system 73 includes the sensor 114 and the gear component 100. However, in this embodiment, the gear component 100 is mounted on the side plate 104 of the wire spool 76, as opposed to on the spool hub 98 as in the previous figures. Here again, during a wire feeding operation, the sensor 114 detects the motion of the gear teeth 116 as the gear component 100 rotates with the wire spool 76. Since the gear component 100 is mounted on the wire spool 76, the detected rotational speed of the gear component 100 may be equated to the rotational speed of the wire spool 76.

Figure 9:
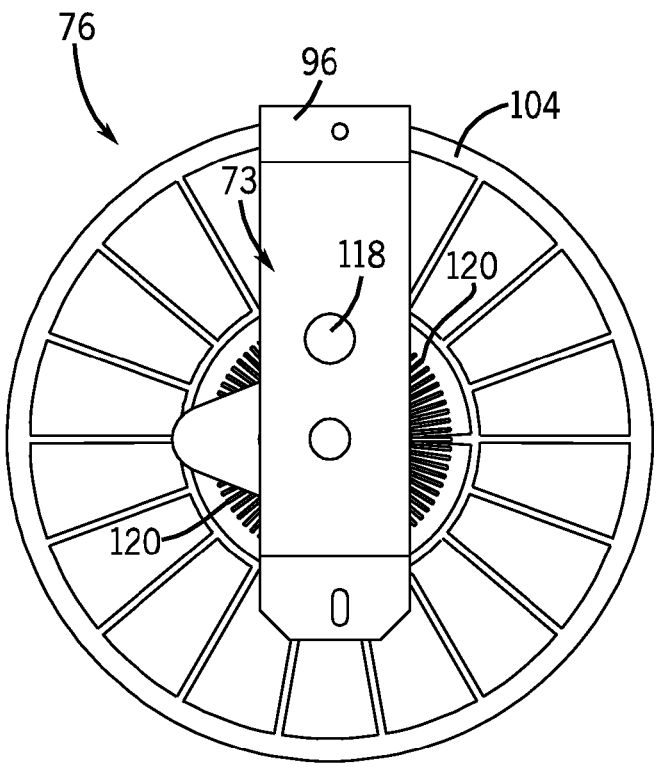
FIG. 9 illustrates a sensing system including a sensor and a plurality of slits disposed on a wire spool.
Figure 10:
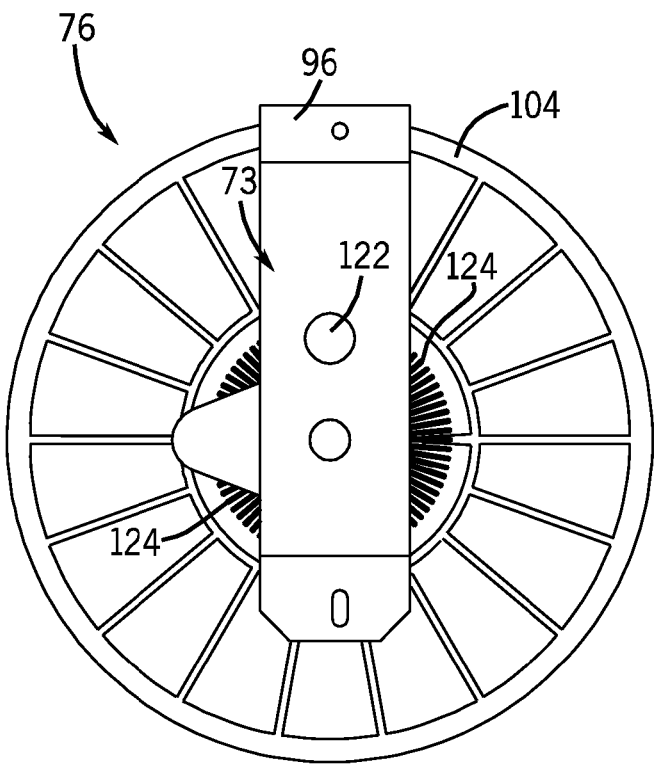
FIG. 10 illustrates a sensing system including a sensor and a plurality of magnetic strips disposed on a wire spool.

FIGS. 9 and 10 illustrate alternate configurations of the sensing systems 73 shown in FIGS. 5 and 6, respectively. In particular, in the embodiment shown in FIG. 9, the sensing system includes the sensor 118 integrated with the stationary spindle mount 96 and the plurality of slits 120. However, in this embodiment, the plurality of slits 120 is disposed on the wire spool 76, not on the spool hub 98 as in the previously described embodiments. As before, as the wire spool 76 rotates, the rotational movement of the slits 120 is detected by the sensor 118. Likewise, in the embodiment of FIG. 10, the sensing system 73 includes the sensor 122 integrated with the substantially stationary spindle mount 96 and the plurality of magnetic strips 124 are disposed on the wire spool 76, not on the hub 98 as in the previously described embodiment of FIG. 6. As before, a measure of the rotational speed of the wire spool 76 is acquired when the rotational movement of the magnetic strips 124 is detected by the sensor 122.

Figure 11:
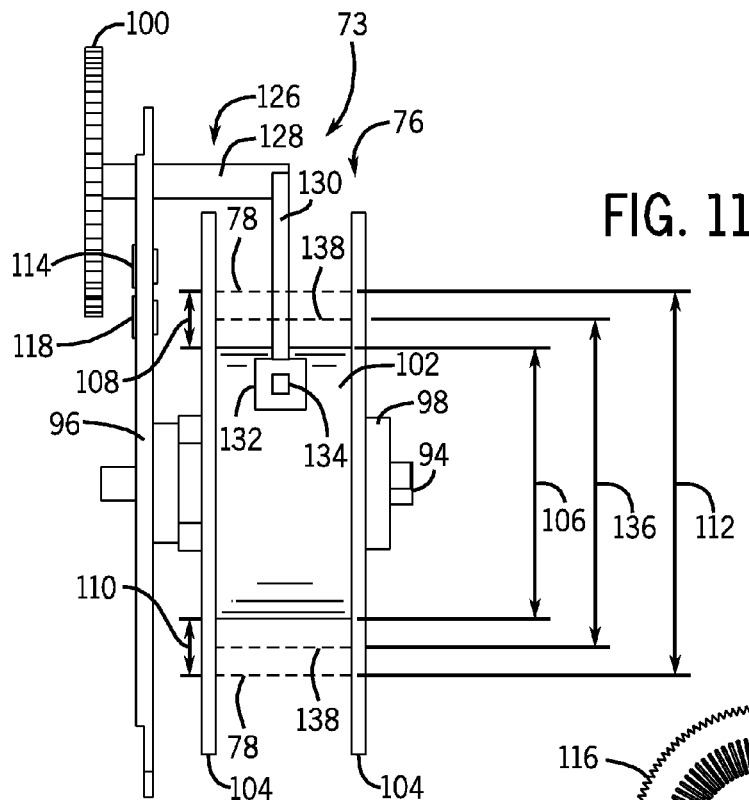
FIG. 11 illustrates a wire spool mounted on a spindle and a mechanical sensing system.
Figure 12:
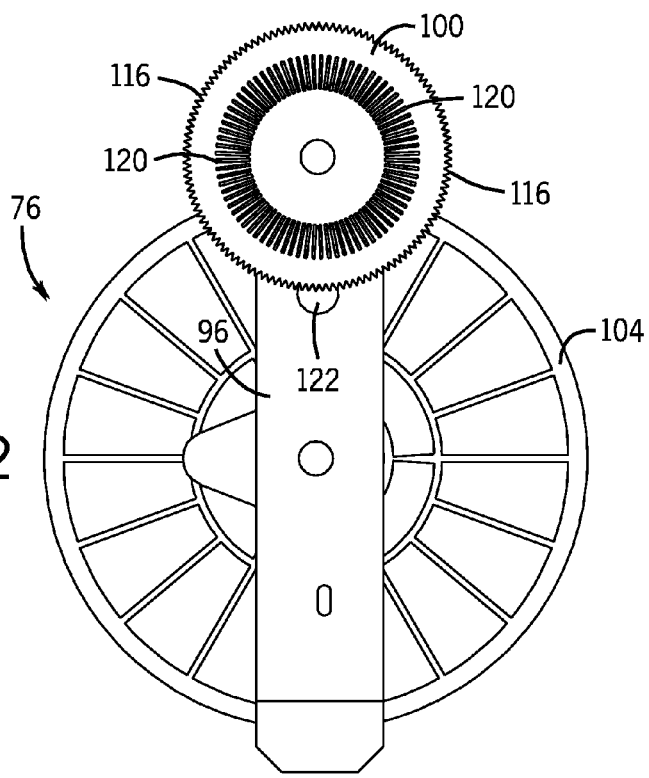
FIG. 12 is a side view of the wire spool and mechanical sensing system of FIG. 11.

FIGS. 11 and 12 illustrate an alternate embodiment of the sensing system 73 that utilizes a mechanical sensing system 126 to detect a parameter indicative of the outer diameter 112 of the wire spool 76. As shown, the mechanical sensing system 126 includes a pivot arm 128, an extension 130 that terminates in a roller 132, and a position sensor 134. During a wire feeding operation, as the wire 78 on the wire spool 76 is unwound and consumed in a welding operation, the outer diameter 112 of the wire 78 is reduced to wire diameter 136, as indicated by lines 138. As the outer diameter 112 decreases to diameter 136, the roller 132 remains in contact with the wire that is still wound on the core 102, and a change in the angle of the extension 130 with respect to the pivot arm 128 is detected by sensor 134. This angle change may be communicated to the control system, and the control system utilizes the sensed parameter to determine the outer diameter of the wire spool during the welding operation.

Figure 13:
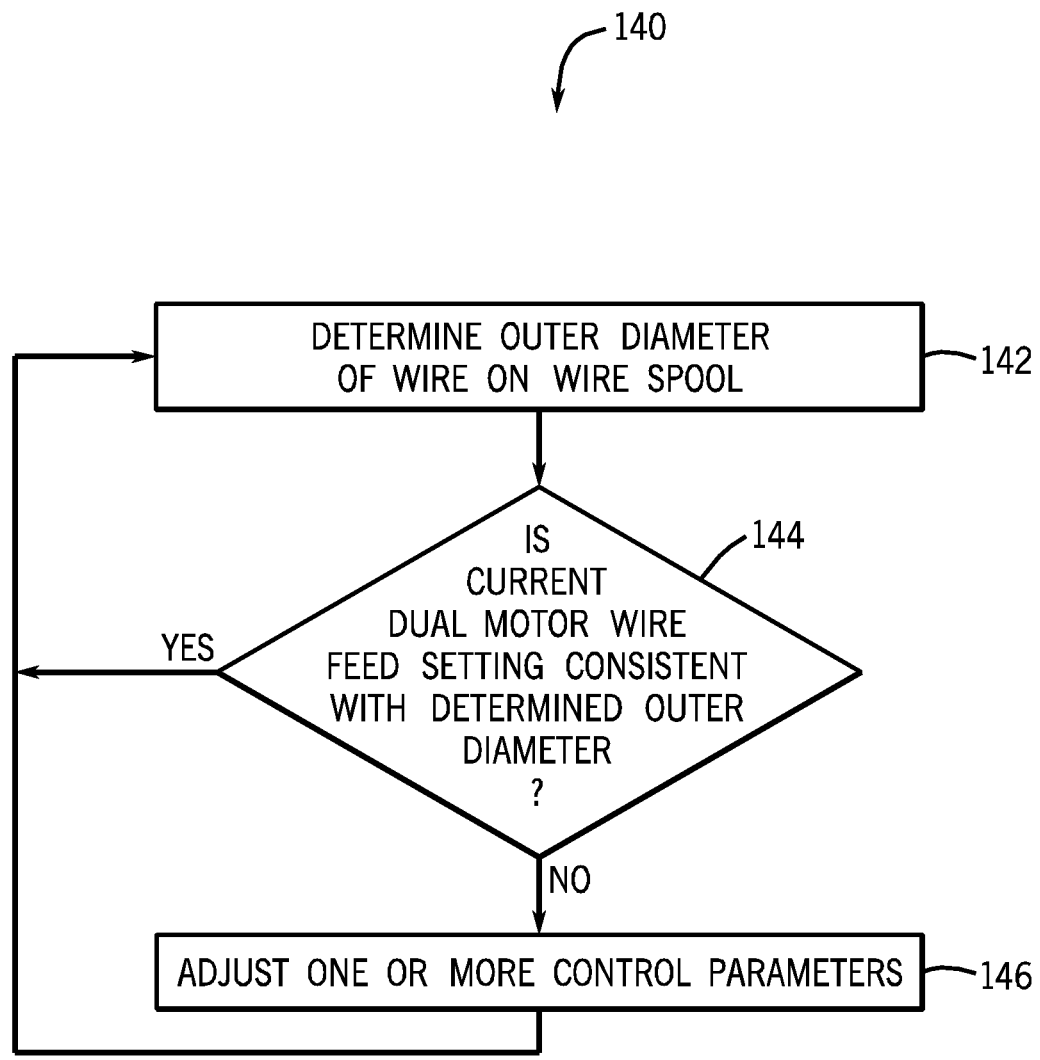
FIG. 13 illustrates an embodiment of a method that may be employed by control circuitry of a wire feeder to adjust a wire feed control parameter based on sensed data.

FIGS. 3-12 illustrate various embodiments of sensing systems that may be utilized to acquire data corresponding to a parameter indicative of the outer diameter of the wire spool. However, it should be noted that the sensing systems are not meant to be limited to the illustrated configurations. Further, it is presently contemplated that once the data is acquired via the sensing system, the sensed data may be utilized for control of the welding or wire feeding processes or to alert an operator to an error or an approaching error. To that end, FIG. 13 illustrates a method 140 that may be implemented by, for example, control circuitry 72 and/or control circuitry 58. The method 140 includes determining the outer diameter of the wire disposed on the core of the wire spool (block 142). For example, if the sensing system senses the rotational speed of the wire spool, the control circuitry may divide the wire feed speed, as determined from the drive rolls, by the sensed rotational speed multiplied by pi to calculate the outer diameter.

The illustrated method 140 proceeds by checking if the current dual motor wire feed setting is consistent with the determined outer diameter (block 144) and, if not, adjusting one or more control parameters (block 146). For example, in traditional push-pull wire feed systems, which may be utilized to feed, for example, aluminum wire, the motor settings of the push motor and the pull motor may be preset to settings suitable for the initial outer diameter of the wire spool upon insertion into the wire feeder before any wire is consumed in the welding operation, and these preset values may remain static throughout the wire feeding operation. However, in presently contemplated embodiments, as the outer diameter is reduced and the optimal values for parameters such as motor acceleration, braking system parameters, and so forth, vary, these parameters are adjusted by the control system. Accordingly, as wire is consumed in the welding operation and the overall size and weight of the wire spool changes throughout the wire feeding operation, parameters of the dual motor and braking systems may be adjusted to optimize performance.

Figure 14:
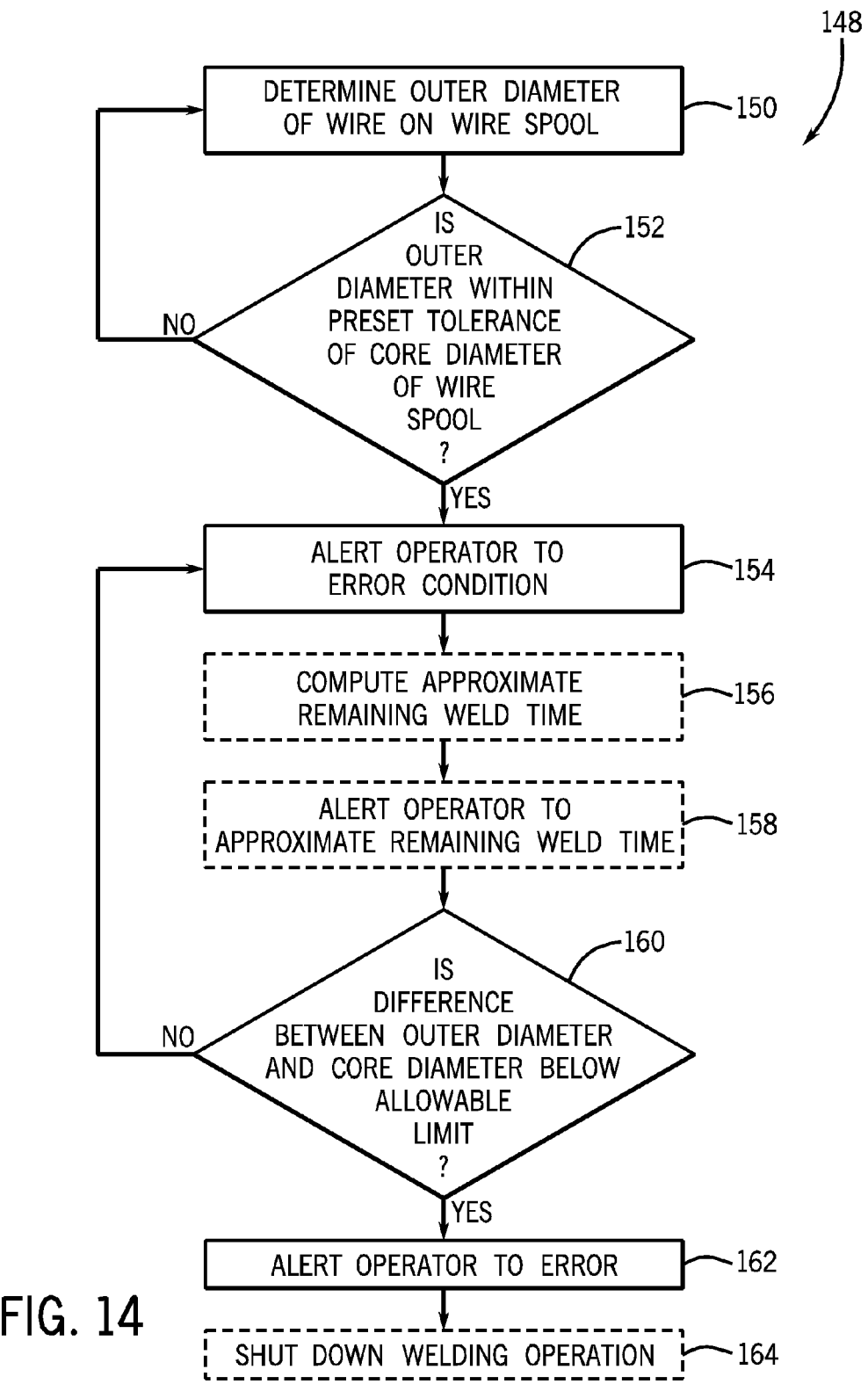
FIG. 14 illustrates an embodiment of a method that may be employed by control circuitry to utilize sensed data to alert an operator to the presence of an error.

FIG. 14 illustrates an embodiment of an alternate method 148 that may be employed by the control circuitry to utilize the sensed data for control of the welding system. As before, the method 148 includes determining the outer diameter of the wire on the wire spool (block 150). The method 148 proceeds by checking if the determined outer diameter is within a preset tolerance of the core diameter of the wire spool (block 152) and, if it is not, the outer diameter is further monitored. However, if the outer diameter is within the given tolerance, the operator is alerted to an error condition (block 154). The foregoing feature may reduce or eliminate the likelihood of a burn back occurring due to an operator not being aware of an imminent lack of wire on the wire spool. In certain embodiments, the method 148 may terminate with the error condition being communicated to the operator.

In other embodiments, however, the method 148 may proceed by computing an approximate remaining amount of weld time that will be available to the operator until the wire supply on the wire spool is exhausted (block 156) and alerting the operator to the computed amount of time (block 158). Further, once the operator has been alerted to the presence of the error, the method 148 may include a check as to whether the difference between the outer diameter and the core diameter is below an allowable limit (block 160) and, if so, the operator may be alerted to the error (block 162), and the operation is shut down (block 164). This may occur, for example, when the operator has nearly exhausted the available wire supply, and a burn back occurrence is imminent.

Figure 15:
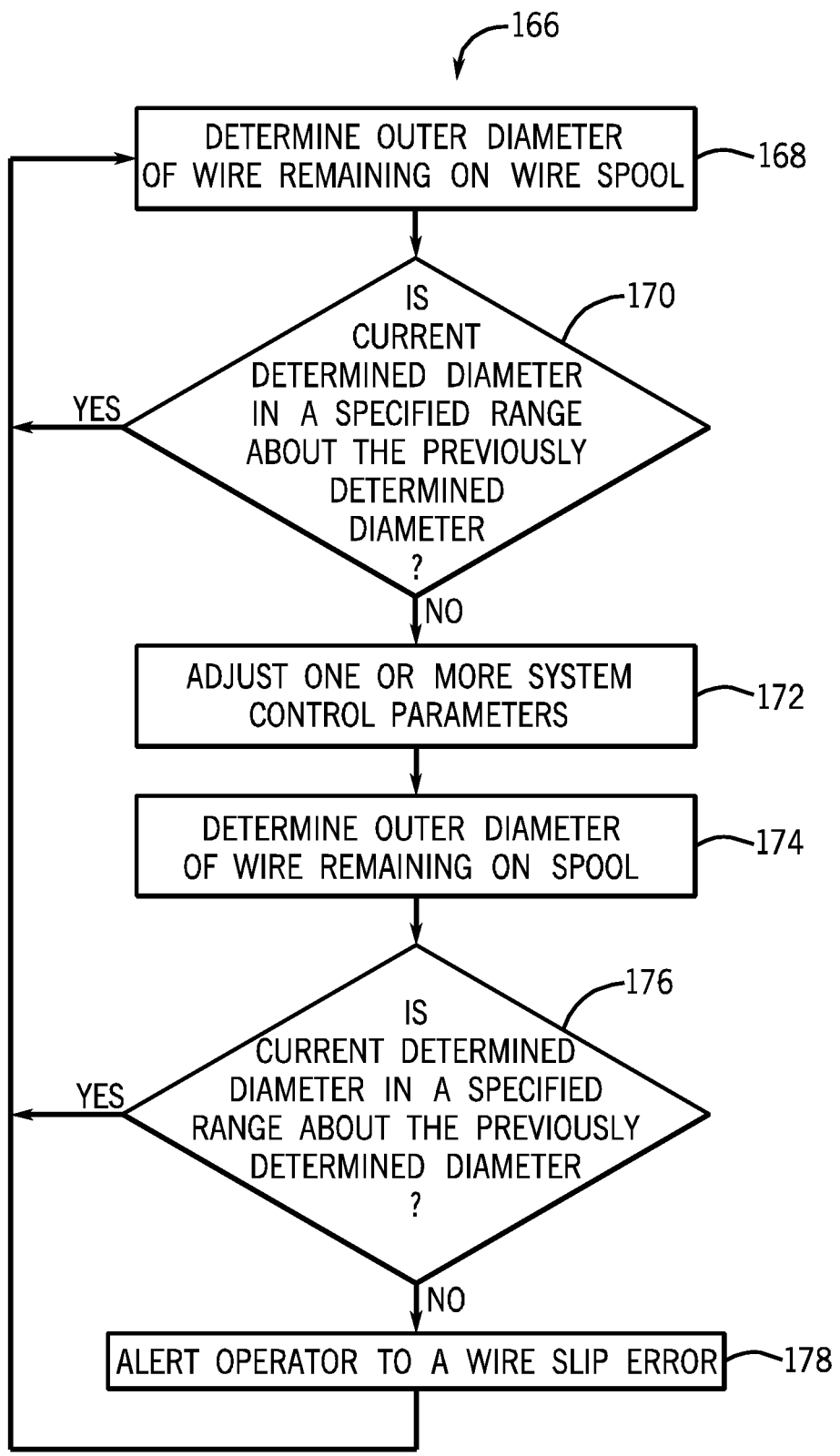
FIG. 15 illustrates an embodiment of a method that may be employed by control circuitry to utilize sensed data to alert an operator to the presence of a wire slip error.

FIG. 15 illustrates a method 166 that may be implemented by, for example, control circuitry 72 and/or control circuitry 58. The method 166 includes determining the outer diameter of the wire remaining on the core of the wire spool (block 168). For example, if the sensing system senses the rotational speed of the wire spool, the control circuitry may divide the wire feed speed, as determined from the drive rolls, by the sensed rotational speed multiplied by pi to calculate the outer diameter. The illustrated method 166 proceeds by checking if the current determined diameter is in a specified range about the previously determined diameter (block 170) and, if not, adjusting one or more control parameters (block 172) to attempt to bring the current determined diameter into a desired range. The method 166 proceeds by determining the outer diameter of the wire remaining on the wire spool (block 174) and again checking if the current determined diameter is in a specified range about the previously determined diameter (block 176).

If the current determined diameter is not in the specified range about the previously determined diameter, the operator is alerted to the presence of a wire slip error (block 178). The foregoing feature of presently disclosed embodiments may offer the advantage of monitoring for wire slip errors throughout the welding process. That is, by indirectly or directly monitoring the amount of wire remaining on the wire spool, wire slip errors, in which the drive roll velocity is not approximately equal to the wire spool velocity, may be detected. Further, these wire slip errors may be communicated to the welding operator throughout the welding operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
 a wire spool comprising a core having a core diameter and wire wound around the core and having an outer diameter:
  a wire sensor configured to sense a measured outer diameter of the wire wound around the core of the wire spool;
  a first sensor component disposed on the wire spool or a wire spool hub and configured to sense a rotational speed of the wire spool; and
  a second sensor component configured to sense a rotational speed of a drive roll of a wire feed drive mechanism that unwinds the wire from the wire spool; and
 a control system configured to receive data relating to the rotational speeds of the wire spool and the drive roll from the first and second sensor components, and the measured outer diameter of the wire wound around the core of the wire spool, to determine a determined outer diameter of the wire wound around the core of the wire spool based on the rotational speed of the wire spool, the rotational speed of the drive roll, and a known diameter of the drive roll, and to determine a wire slip error based on a comparison of the determined outer diameter of the wire wound around the core of the wire spool and the measured outer diameter of the wire wound around the core of the wire spool.

2. The system of claim 1, wherein the control system is configured to determine when the outer diameter is within a preset tolerance of the core diameter and to alert an operator when the outer diameter is within the preset tolerance.

3. The system of claim 1, wherein the control system is configured to utilize the received data to determine one or more operating parameter adjustments of a dual motor wire feeding system of the wire feed drive mechanism.

4. The system of claim 1, wherein the first sensor component comprises slots disposed on the wire spool or the wire spool hub, and an encoder sensor configured to sense revolutions of the slots.

5. The system of claim 1, wherein the first sensor component comprises magnetic strips, and a Hall effect sensor configured to detect revolutions of the magnetic strips.

6. The system of claim 1, wherein the first sensor component comprises a gear component comprising gear teeth and being disposed on the wire spool or the wire spool hub, and a sensor configured to detect revolutions of the gear teeth.

7. A welding wire feed system, comprising:
 a spool mounting hub;
 a wire spool mounted on the spool mounting hub, wherein the wire spool comprises a core and wire wound around the core having an outer diameter;
 a wire sensor configured to sense a measured outer diameter of the wire wound around the core of the wire spool;
 a first sensor coupled to the spool mounting hub, the wire spool, or both, and configured to measure a rotational speed of the wire spool as the wire is unwound from the core;
 a second sensor configured to sense a rotational speed of a drive roll of a wire feed drive mechanism that unwinds the wire from the wire spool; and
 control circuitry configured to receive data from the wire sensor, the first sensor, and the second sensor and to determine a determined outer diameter of the wire wound around the core of the wire spool based on the rotational speed of the wire spool, the rotational speed of the drive roll, and a known diameter of the drive roll, and to determine a wire slip error based on the determined outer diameter of the wire wound around the core of the wire spool and the measured outer diameter of the wire wound around the core of the wire spool.

8. The welding wire feed system of claim 7, wherein the control circuitry is configured to alert an operator to an error when the outer diameter is approximately equal to a diameter of the core.

9. The welding wire feed system of claim 7, wherein the control circuitry is configured to adjust a control parameter of a dual motor wire feed system of the wire feed drive mechanism based on the received data.

10. The welding wire feed system of claim 9, wherein the control parameter comprises a control signal that controls a brake pressure applied to a drive motor of the dual motor wire feed system.

11. The welding wire feed system of claim 7, wherein the control circuitry is configured to compute an approximate remaining weld time based on the outer diameter of the wire.

12. A welding wire feed system, comprising:
 a spool mounting hub;
 a wire spool configured to be mounted on the spool mounting hub, wherein the wire spool comprises a core and wire wound around the core having an outer diameter;
 a wire feed drive mechanism configured to unwind the wire from the core to supply the wire to a welding operation;
 a wire sensor configured to sense a measured outer diameter of the wire wound around the core of the wire spool;
 a first sensor coupled to the spool mounting hub, the wire spool, or both, and configured to measure a rotational speed of the wire spool as the wire is unwound from the core;
 a second sensor configured to sense a rotational speed of a drive roll of the wire feed drive mechanism; and
 control circuitry configured to receive data relating to the rotational speeds of the wire spool and the drive roll from the first and second sensors, and the measured outer diameter of the wire wound around the core of the wire spool, to determine a determined outer diameter of the wire wound around the core of the wire spool based on the rotational speed of the wire spool, the rotational speed of the drive roll, and a known diameter of the drive roll, and to determine a wire slip error and control a brake pressure applied to a drive motor of the wire feed drive mechanism based on a comparison of the determined outer diameter of the wire wound around the core of the wire spool and the measured outer diameter of the wire wound around the core of the wire spool.

13. The welding wire feed system of claim 12, wherein the wire feed drive mechanism comprises a pair of drive rolls and a motor configured to provide energy to power the pair of drive rolls.

14. The welding wire feed system of claim 12, wherein the wire feed drive mechanism comprises a dual motor drive system comprising a push motor and a pull motor configured to cooperate to supply the wire to the welding operation.

15. The welding wire feed system of claim 14, wherein the control circuitry is configured to utilize the determined outer diameter to adjust one or more control parameters of the dual motor drive system.

* * * * *